United States Patent Office 3,395,695
Patented Aug. 6, 1968

3,395,695
COOKER HAVING A STEAM PRESSURE
CONTROL VALVE
Jiro Nagashima, 753 Kamitaga, Atami-shi, Shizuoka-ken, Japan, and Akira Aoki, 230 Ida, Kawasaki-shi, Kanagawa-ken, Japan
Filed June 9, 1965, Ser. No. 462,491
Claims priority, application Japan, June 5, 1965, 40/32,968, 40/32,970
1 Claim. (Cl. 126—369)

ABSTRACT OF THE DISCLOSURE

Pressure cooker having a steam pressure control valve having a fixed size aperture and a movable impervious plate provided with groups of apertures. Each group of apertures has a total cross-sectional area different from that of any other group. The individual groups of apertures are selectively positioned in registry with the fixed size aperture, whereby a plurality of steam pressures can be selectively set in the pressure cooker.

---

This invention relates generally to cooking devices and equipment and more particularly to a cooking device using steam for cooking frozen foods.

Since, it is possible to buy in many markets so-called frozen foods which can be cooked very easily at home in an oven or in a pan which contains boiling water, so-called frozen foods are considered to be epoch-making in the developed countries. However, experience has proven that it is troublesome to cook frozen foods. The food can burn while cooking it in the oven; the boiling water which is in the receptacle can flow over, the condensation on the cover of the pan can start to drip into the food, the water in which the food is dipped into can completely evaporate; therefore it is said that the above mentioned troubles have restricted somewhat the use of frozen foods.

A principal object of the present invention is to provide cooking apparatus using steam for cooking frozen foods which can be used very easily and very quickly.

Another object of the present invention is to provide cooking apparatus using steam for cooking frozen foods which can be used for restaurants, hospitals and the military services, etc.

The foregoing and other objects and advantages of the invention will become apparent from the following description of a preferred embodiment thereof as illustrated in the accompanying drawings forming a part hereof in which.

Figure 1:
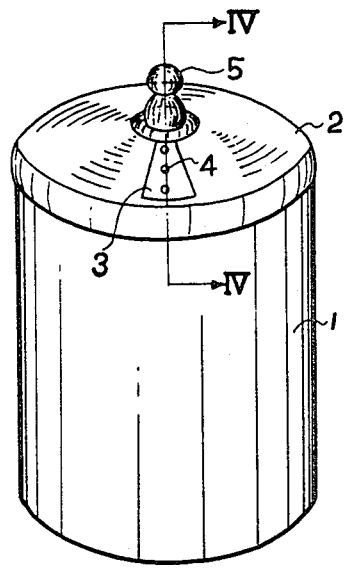
FIG. 1 is a perspective view of a steam pan according to the present invention.
Figure 2:
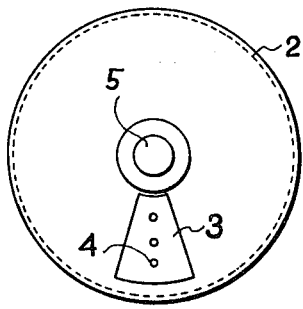
FIG. 2 is a plan view of the steam pan of FIG. 1.
Figure 3:
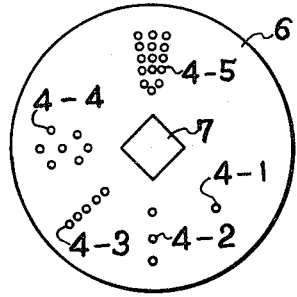
FIG. 3 is a plan view of the attachment of the cover of FIG. 2.

The present invention comprises, a cooking device for frozen foods in which steam is generated inside the device while cooking in the home, and cooking equipment for frozen foods in which steam is supplied from steam generating equipment suc has a boiler etc., as equipment for restaurants, hospitals. FIGS. 1 to 6 show the embodiments of the first mentioned case.

As shown in FIGS. 1, 2, 3, 4 and 5, a steam cooker 1 is provided with a cover 2 which has an adjustable aperture 3, as shown in the drawings. An attachment or value element 6, made as a thin circular plate, is provided with a square cut aperture 7 disposed at the center portion of the circular plate and is provided with several groups of holes 4–1, 4–2, 4–3, 4–4 and 4–5, etc. disposed on the radial portion of the circular plate which can be brought into registry with the aperture 3 of the cover 2 by rotation thereof. When the attachment 6 is rotated it still remains secured to the cover 2.

Figure 4:
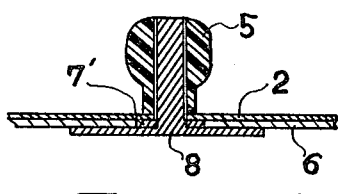
FIG. 4 is a sectional view of the knob portion of the steam pan taken along section line IV—IV in FIG. 1.
Figure 5:
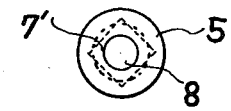
FIG. 5 is a plan view of the knob of the cover of the steam pan shown in FIG. 1.

A knob 5 is secured to the cover 2 at the center portion of the cover 2 by means of screw or fastener 8. The fastener 8 has a square flange portion 7′ as shown in the drawing of FIG. 4, which corresponds to the square cut aperture 7 of the attachment 6. Therefore if the attachment 6 is secured to the cover 2 by means of fitting with the square flange portion 7′, as shown in the drawing of FIG. 4, it is possible to rotate the attachment 6 around the center of the cover 2 so as to change the arrangement or groups of holes 4–1, 4–2, 4–3, 4–4 and 4–5 in registry with the aperture 3, in other words, so as to change the distribution of hole or holes arranged to coincide with the aperture 3 of the cover 2, by turning the knob 5 manually.

An intermediate plate (not shown) is disposed at the lower portion inside of the steam pan 1 and a plurality of small holes are disposed at the intermediate plate.

When, one puts water into the bottom portion under the intermediate plate of the steam pan 1 and then heats the steam pan 1 by a suitable heat source such as an electric heater, steam is generated inside the steam pan 1.

In the first step of generating steam, it is better to close the aperture 3 before boiling water, however, once the water starts to boil it is also better to open the aperture 3 so as to control the steam pressure generated inside the steam pan 1, otherwise the boiled water may flow out of the steam pan 1. The aperture 3 is controlled by turning the knob 5 as mentioned above.

While generating steam inside the steam pan 1, the frozen foods are kept on the above mentioned intermediate plate, and then are heated by steam and cooked without burning or evaporating of water contained in the frozen foods.

It is clear better cooking of the frozen foods is obtained by using the steam pan, compared with cooking by using a conventional oven.

The construction of the cover 2 is unique in controlling the steam pressure generated in the steam pan. Therefore, the cover 2 having a controllable aperture, it is possible to use a conventional pan for cooking. For instance, cooking by boiling of some foods in the pan with above mentioned cover, the trouble of over flow can be prevented.

Figure 6:
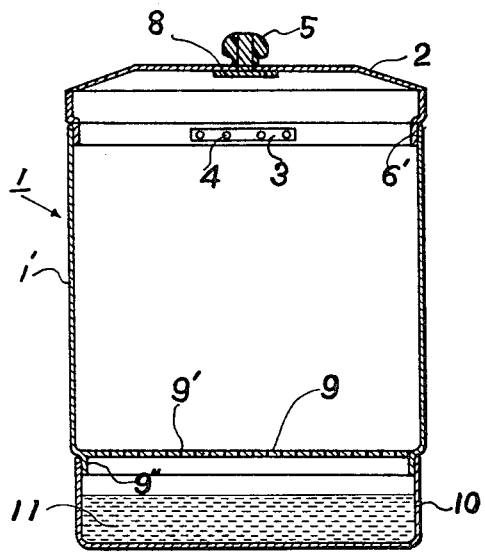
FIG. 6 is a sectional view of another embodiment of a steam pan according to the present invention.

FIG. 6 shows the other embodiment of th steam pan according to the present invention. Knob 5 is rigidly secured to cover 2, and pan 1 comprises a cylindrical wall 1′ and an upper edge portion having an aperture 3 as shown in the drawing, and a bottom plate 9 which is provided with a plurality of small holes 9′ and a bottom flange portion 9″ extending downwards from the portion of the bottom plate 9. The flange portion 9″ is supported by an upper edge portion of a receptacle 10 of water 11 as shown in the drawing.

The cover 2 is provided with a concave bottom edge portion 6′ so as to fit to the inside wall of the upper edge portion of the pan 1 and also provided with several groups of holes 4 disposed at the corresponding level to the aperture 3 of the pan 1.

When, one puts water 11 into the receptacle 10 and then arranges the pan 1 and the cover 2 so as to combine the conditions as shown in the drawing 6, and then heats the receptacle 10 by a suitable heat source, such as an electric heater, steam is generated inside the receptacle 10 and passes through the small holes 9′ and comes into the pan 1. The control of the aperture 3 is operated by turning the knob 5 by hand and the same operation controls the steam pressure generated inside the pan 1 similarly to that of the above-mentioned embodiment of FIG. 1.

As described above, the cooking device using steam according to the present invention has many advantages compared with the conventional device, such as an oven, and moreover, the cooking equipment using steam for frozen foods provides the possibility of supplying foods to many persons in a very short time and with economy of labor. It will be understood that the different features of the embodiment in the drawings as described above, are interchangeable in so far as they are mutually compatible and that other modifications may be made without deviating from the spirit of the invention as defined in the appended claim.

What is claimed is:

1. A pressure cooker having a container body for receiving therein food to be cooked and water convertible to steam, a steam pressure control valve formed on said container comprising a fixed size opening on said cooker in communication with the exterior of said cooker and the atmosphere externally of said cooker, a movable plate having an impervious portion for closing said opening and having a plurality of groups of apertures, each group of apertures having a total cross-sectional area different from that of any other group, means movably mounting said plate on said pressure cooker, and means for selectively operating said plate to a position in which said impervious portion is in registry with said opening closing said opening and to different positions in which different ones of said groups of apertures are positioned in registry with said opening, whereby, a plurality of steam pressures can be set in said pressure cooker.

References Cited

UNITED STATES PATENTS

| | | | |
|---|---|---|---|
| 484,599 | 10/1892 | Marshfield | 126—369 |
| 529,800 | 11/1894 | Matthews | 126—290 |
| 673,010 | 4/1901 | Rosenthal | 220—44 |
| 1,409,902 | 3/1922 | Ausen | 220—44 |
| 1,711,631 | 5/1929 | Burnett | 126—369 |
| 2,742,850 | 4/1956 | LaFond. | |

FREDERICK L. MATTESON, JR., *Primary Examiner.*

ROBERT A. DUA, *Assistant Examiner.*